United States Patent
Takemura et al.

(10) Patent No.: US 6,273,830 B1
(45) Date of Patent: Aug. 14, 2001

(54) TAPERED HOLLOW SHAFT

(75) Inventors: Shinichi Takemura, Yokohama; Hideyuki Ohno, Tokyo; Tomohiro Nakanishi, Kisarazu; Yutaka Arai, Himeji; Mikio Shima, Tokyo, all of (JP)

(73) Assignees: Nippon Mitsubishi Oil Corporation; Nippon Steel Corporation; Nippon Steel Chemical Co., Ltd.; Nippon Graphite Fiber Corporation, all of Tokyo (JP)

( * ) Notice: Subject to any disclaimer, the term of this patent is extended or adjusted under 35 U.S.C. 154(b) by 0 days.

(21) Appl. No.: 09/384,385

(22) Filed: Aug. 27, 1999

Related U.S. Application Data

(63) Continuation-in-part of application No. 08/839,807, filed on Apr. 18, 1997.

(30) Foreign Application Priority Data

Apr. 19, 1996 (JP) .................................................. 8-122173

(51) Int. Cl.$^7$ .................................................. A63B 53/10
(52) U.S. Cl. .......................................... 473/319; 428/36.9
(58) Field of Search ................................... 473/316–323; 428/36.9; 264/635; 156/188

(56) References Cited

U.S. PATENT DOCUMENTS

| | | | |
|---|---|---|---|
| 3,998,458 | * | 12/1976 | Inoue ................................... 473/319 |
| 4,269,876 | * | 5/1981 | Lind ...................................... 427/309 |
| 4,690,738 | * | 9/1987 | Desarmot et al. .................... 204/130 |
| 4,874,563 | * | 10/1989 | McMahon ............................ 264/29.2 |
| 4,974,451 | * | 12/1990 | DeTeresa ............................... 73/821 |
| 5,004,590 | * | 4/1991 | Schimpf ............................ 425/447.2 |
| 5,049,422 | * | 9/1991 | Honma ................................. 473/320 |
| 5,093,162 | * | 3/1992 | Fenton ................................. 473/319 |
| 5,156,396 | * | 10/1992 | Akatsuka et al. . |
| 5,421,573 | * | 6/1995 | Kawamatsu .......................... 473/319 |
| 5,437,450 | * | 8/1995 | Akatsuka et al. . |
| 5,552,214 | * | 9/1996 | Kobomura ............................ 442/391 |
| 5,556,677 | * | 9/1996 | Quigley ............................... 428/36.2 |
| 5,569,099 | * | 10/1996 | Jackson ................................ 473/319 |
| 5,612,424 | * | 3/1997 | Sato et al. ............................ 525/530 |
| 5,721,030 | * | 2/1998 | Okada ................................. 428/36.3 |

FOREIGN PATENT DOCUMENTS 8-217896  8/1996  (JP) .

OTHER PUBLICATIONS

E. J. Walker, "The Importance of Fibre Type and Fibre Surface in Controlling Composite Properties", Charpter 2 of "Essentials of Carbon–Carbon Composites", The Royal Society of Chemistry, 1993.

* cited by examiner

Primary Examiner—Jeanette Chapman
Assistant Examiner—Stephen L. Blau
(74) Attorney, Agent, or Firm—Kubovcik & Kubovcik

(57) ABSTRACT

A tapered hollow shaft made of a fiber reinforced composite material, which comprises: (a) at least one angle layer consisting essentially of polyacrylonitrile-based carbon fibers having a tensile modulus ranging from 200 to 500 GPa and a tensile strength ranging from 4000 to 5600 MPa; (b) at least one straight layer consisting essentially of polyacrylonitrile-based carbon fibers having a tensile modulus ranging from 200 to 460 GPa and a tensile strength ranging from 3500 to 5600 MPa; (c) at least one reinforcing layer consisting essentially of pitch-based carbon fibers or polyacrylonitrile-based carbon fibers each having a compressive breaking strain of 1.7 to 5.0%, a tensile modulus ranging from 5 to 160 GPa, a tensile strength ranging from 500 to 3000 MPa and a density ranging from 1.5 to 1.9 g/cm$^3$ with the carbon fibers in the reinforcing layer being oriented to incline at an angle of 0° to ±5° to the axial direction of the shaft, with the reinforcing layer being arranged at the thinner portion of the shaft to extend from a tip thereof up to at least $\frac{1}{20}$ and not more than $\frac{3}{4}$ of the entire length of the shaft, and with the reinforcing layer being arranged at the outermost portion of the shaft.

7 Claims, 8 Drawing Sheets

TAPERED HOLLOW SHAFT

This application is a continuation-in part of application Ser. No. 08/839,807, filed Apr. 18, 1997.

BACKGROUND OF THE INVENTION

1. Technical Field

This invention relates to a tapered hollow shaft, and in particular to a tapered hollow shaft made of a fiber-reinforced composite material comprising reinforcing fibers having a specific tensile modulus.

2. Description of the Prior Art

A golf club receives a large shock, for instance, in the case of impacting a ball with a spot that is beside a sweet spot or in the case of hard hitting the ground, which is called "duff," in the swing. Particularly, the largest impact stress is produced at the junction between the golf shaft and the golf head, that is, in the vicinity of the hosel. Therefore, the use of conventional carbon fiber reinforced composite shafts, namely carbon shafts, results in that the breaking incident of the shaft is sometimes caused depending upon the condition of the shaft used by a user. In order to avoid such a breaking incident, many golf shaft manufacturers have come up with various ideas to improve the tip portion of the shaft in impact resistance.

Given as one instance of these ideas is a technique in which the tip portion of the shaft is reinforced using high strength PAN (polyacrylonitrile)-based carbon fibers which are said to have high impact resistance. This technique intends to improve the tip portion of the shaft in impact resistance by orienting the high strength PAN-based carbon fibers to be substantially parallel to the longitudinal direction of the shaft and disposing them at the tip portion of the shaft to form a reinforcing layer. The high strength PAN-based carbon fibers are carbon fibers which are widely used not only in the fields of golf shafts but also in various industrial and manufacturing fields as well as in sport and leisure products such as fishing rods, tennis rackets and badminton rackets at present.

The high strength PAN-based carbon fibers are characterized in that its tensile strength is outstandingly higher than that of conventional common carbon fibers. This is evidence to prove that the manufacturers of PAN-based carbon fibers believe that it is effective to improve the carbon fibers in tensile strength in order to better the carbon shaft in impact resistance. For instance, the strand tensile strength of Toray T700S (strand tensile modulus: 230 GPa) which is widely used as one of the high strength PAN-based carbon fibers is 4900 GPa. This is improved about 40% more than the strand tensile strength (3530 MPa) of Toray T300 (strand tensile modulus: 230 GPa) which has been widely used as a common grade. In this manner, the PAN-based carbon fibers have been remarkably improved in tensile strength. High performance grades that are further improved in the tensile strength are currently sold on the market.

Generally, carbon fibers are loosely classified into PAN (polyacrylonitrile)-based carbon fibers and pitch-based carbon fibers. It can be said in common to conventional PAN-based carbon fibers and pitch-based carbon fibers that the compressive qualities are lower than the tensile qualities.

Not only fiber reinforced composite materials, but also all materials are deformed by the application of stress to produce strain. To mention specifically, tensile stress causes tensile strain whereas compressive stress causes compressive strain. For instance, a shaft for use in a golf club is also deformed ark-like when impact-bending stress is produced in the shaft by impacting a ball or by hard hitting the ground. As a consequence, compressive strain is caused by the compressive stress on the side of the center of curvature of the arc and tensile strain is caused by the tensile stress on the side opposite to the center of curvature.

The inventors noted the fact that the conventional carbon shaft with the tip portion reinforced by high strength PAN-based carbon fibers produces flexural rupture by a rupture mode dominated by the compressive side. More concretely, the inventors paid attention to the fact that the shaft deformed arc-like by the application of impact stress produces compressive rupture from the side of the center of curvature of arc at which the compressive strain is produced, and they considered this is because the compressive rupture occurs preceding to tensile rupture since the compressive breaking strain the high strength PAN-based carbon fibers have is smaller than its tensile breaking strain.

The high strength PAN-based carbon fibers bear a maximum level of compressive breaking strain among carbon fibers currently used. For instance, the compressive breaking strain of Toray T700S (unidirectional composite plate) is 1.4% which is found to be higher than those of common grade PAN-based carbon fibers, e.g., Toray T300 (1.0%) and Toray M30S (0.9%) and those of high modulus PAN-based carbon fibers, e.g., Toray M40J (0.7%), Toray M46J (0.5%), Toray M50J (0.4%) and Toray M60J (0.25%). However, the tensile breaking strain of Toray T700S (unidirectional composite plate) is 1.7%, showing that the compressive breaking strain is lower than the tensile breaking strain. Therefore, even the shaft with the tip portion reinforced using high strength PAN-based carbon fibers produces flexural rupture dominated by the compressive side. Therefore the inventors considered that the excellent tensile strength of the high strength PAN-based carbon fibers is not reflected on an improvement in the impact resistance of the shaft and a fundamental improvement in the impact resistance has not been made. On the basis of the fact that any carbon fibers with a compressive breaking strain exceeding 1.4% has not been used usually, even if the tip portion of the shaft is reinforced by carbon fibers having the highest tensile strength, flexural rupture dominated by the compressive side is eventually caused since the compressive breaking strain is 1.4% or less. It is therefore considered that there is room for improvement in impact resistance of the conventional carbon shaft.

Moreover, the conventional carbon shaft with the tip portion reinforced by high strength PAN-based carbon fibers has another drawback that the reinforced section has only poor flexibility. The strand tensile modulus of the high strength PAN-based carbon fibers is in the range of 230 GPa to 240 GPa. These values are much higher than the tensile modulus (from 5 GPa to 160 GPa) of low modulus carbon fibers used in this invention. The conventional carbon shaft reinforced using high strength PAN-based carbon fibers to improve the tip portion of the shaft in impact resistance has the drawback that it is, as aforementioned, not only unimproved in the impact resistance of the shaft, but also increased in the flexural rigidity in the reinforced section, thereby impairing the flexibility.

The reinforcement of the tip portion of the shaft by using high strength PAN-based carbon fibers has the problem of impaired flexibility. In view of this problem, Fenton et al (U.S. Pat. No. 5,093,162) used glass fibers as reinforced fibers having a low tensile modulus to secure the flexibility of the tip portion of the shaft.

Because each strand tensile strength of glass fibers and aramid fibers is as high as 3100 MPa and 3600 MPa respectively, these low modulus reinforcing fibers have been considered to be able to impart flexibility to the reinforced portion and, at the same time, to have an effect on the improvement in the impact resistance of the tip portion of the shaft. However, the compressive breaking strain of a unidirectional composite plate comprising glass fibers is 1.3% and particularly the compressive breaking strain of aramid fibers which are said to have high impact resistance is only 0.36%. Even if the tip portion of the shaft is reinforced using glass fibers or aramid fibers, the shaft produces flexural rupture dominated by the compressive side the same as the cases where the tip portion is reinforced by using high strength PAN-based carbon fibers, giving rise to the problem that the high tensile strength of the glass fibers or aramid fibers is not sufficiently reflected on the improvement in the impact resistance of the shaft.

As outlined above, the use of reinforcing fibers having high tensile strength has been considered to be of importance to improve the carbon shafts in impact resistance. However, in the conventional carbon shaft, there was not used reinforcing fibers having a compressive breaking strain exceeding that (1.4% or less) of the PAN-based carbon fibers. Therefore, even if the tip portion of the shaft is reinforced by carbon fibers such as high strength PAN-based carbon fibers having the highest tensile strength, flexural rupture from the compressive side dominates resulting in insufficient improvement in the impact resistance. Moreover, when the tip portion of the shaft is reinforced using high strength PAN-based carbon fibers having high tensile modulus, thereby causing the flexural rigidity to be increased, bringing about the abuse that the flexibility is impaired.

Even in the cases where the tip portion of the shaft is reinforced by low modulus reinforcing fibers, such as glass fibers or aramid fibers to impart flexibility to the tip portion of the shaft, the flexibility can be imparted, but the impact resistance of the shaft is eventually unimproved.

SUMMARY OF THE INVENTION

Accordingly, an object of this invention is to solve the aforementioned problem for providing a tapered hollow shaft that is light in weight and high in flexibility while maintaining its sufficient flexural strength.

It has been found that the above object can be accomplished by providing a tapered hollow shaft having the following features.

This invention provides a tapered hollow shaft made of a fiber reinforced composite material, which comprises:
 (a) at least one angle layer consisting essentially of polyacrylonitrile-based carbon fibers having a tensile modulus ranging from 200 to 500 GPa and a tensile strength ranging from 4000 to 5600 MPa;
 (b) at least one straight layer consisting essentially of polyacrylonitrile-based carbon fibers having a tensile modulus ranging from 200 to 460 GPa and a tensile strength ranging from 3500 to 5600 MPa;
 (c) at least one reinforcing layer consisting essentially of pitch-based carbon fibers or polyacrylonitrile-based carbon fibers each having a compressive breaking strain of 1.7 to 5.0%, a tensile modulus ranging from 5 to 160 GPa, a tensile strength ranging from 500 to 3000 MPa and a density ranging from 1.5 to 1.9 g/cm$^3$ with the carbon fibers in the reinforcing layer being oriented to incline at an angle of 0° to ±5° to the axial direction of the shaft, with said reinforcing layer being arranged at the thinner portion of the shaft to extend from a tip thereof up to at least 1/20 and not more than 3/4 of the entire length of the shaft, and with the reinforcing layer being arranged at the outermost portion of the shaft.

DESCRIPTION OF THE PREFERRED EMBODIMENTS

Figure 1:
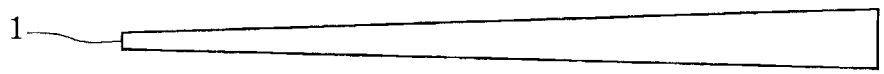
FIG. 1(a) shows a plan view of a mandrel.
FIG. 1(b) shows a section of a positive angle layer portion.
FIG. 1(c) shows a section of a negative angle layer portion.
FIG. 1(d) shows a section of a straight layer.
FIG. 1(e) shows a section of a reinforcing layer.
FIG. 1(f) is a schematic cross-sectional view of a final laminated structure of a shaft.
Figure 1:
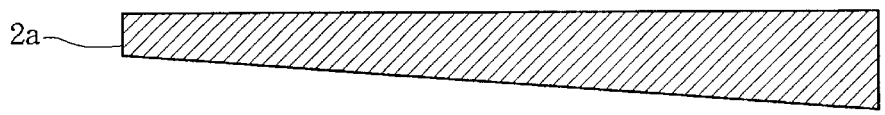
Figure 1:
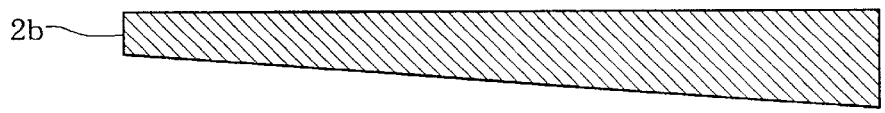
Figure 1:
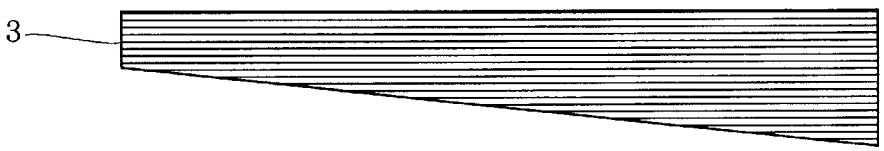
Figure 1:
Figure 1:
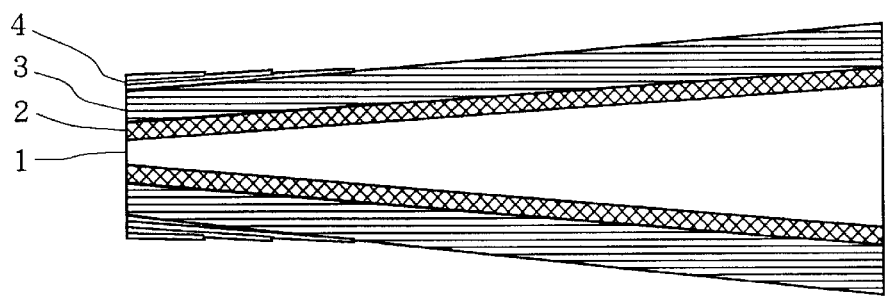

On the contrary to the conventional concept that the impact resistance of a carbon shaft is improved when the tensile strength is improved, it has been found by the inventors that not only the impact resistance of the reinforced portion is outstandingly improved but also superior flexibility can be imparted by reinforcing the tip portion of the shaft by using carbon fibers having a compressive breaking strain of 1.7 to 5.0% and a tensile modulus of as low as 5–160 GPa. This invention provides a tapered hollow shaft having the above characteristics.

According to this invention, a golf carbon shaft can be provided which has an impact resistance high enough to stand against large impact stress produced, for instance, in the case of impacting a ball with a spot which is beside a sweet spot or in the case of hard hitting the ground, which is called "duff," in the swing, and which has superior flexibility of the tip portion of the shaft.

It has been found by the inventors that, in order to improve a shaft in impact resistance, conventional reinforcing fibers having high tensile strength is not used but reinforcing fibers having high compressive breaking strain is used to reinforce the tip portion of the shaft. Such an idea is neither suggested nor disclosed in the prior art documents.

Each strand tensile strength of Granoc XN-05, XN-10 and XN-15, which are low modulus carbon fibers used in this invention, is 1180 MPa, 1750 MPa and 2550 MPa respectively. The strand tensile strength of PAN-based carbon fibers which are widely used at present is 3530 MPa or more, therefore it is safely said that the strand tensile strength of the low modulus carbon fibers used in this invention is lower than that of said PAN-based carbon fibers. Also, the strand tensile strength of the low modulus carbon fibers used in this invention is also lower than the strand tensile strength (3100 MPa) of glass fibers and than the strand tensile strength (3600 MPa) of aramid fibers.

In view of these facts, the use of the low modulus carbon fibers which are inferior in the tensile strength to the conventional reinforcing fibers to improve a carbon shaft in impact resistance is not understandable from the conventional concept. The idea of improving the carbon shaft in impact resistance by making use of the characteristics, specifically the compressive breaking strain of 1.7 to 5.0% the carbon fibers used in this invention have is quite a new idea which has not been found yet.

This invention provides the means to solve the problem that is inherent in the conventional carbon shaft with the tip portion reinforced by high strength PAN-based carbon fibers and that not only the impact resistance is insufficiently improved due to the rupture mode dominated by the compressive side but also the flexibility is impaired, and the problem that is inherent in the conventional carbon shaft with the tip portion reinforced by glass fibers or aramid fibers and that the impact resistance is insufficiently improved due to the rupture mode dominated by the compressive side.

The tapered hollow shaft according to this invention comprises, as an inside layer, an angle layer consisting essentially of a combination of a positive angle layer and a negative angle layer, with both angle layers being laminated by orienting carbon fibers having a tensile modulus ranging from 200 GPa to 1000 GPa, preferably from 200 GPa to 500 GPa, more preferably from 240 to 500 GPa and a tensile strength ranging from 4000 MPa to 5600 MPa to incline at an angle of +40° to +50° and at an angle of –50° to –40° respectively to the longitudinal direction of the shaft and, as an outside layer, a straight layer laminated by orienting carbon fibers having a tensile modulus ranging from 200 GPa to 460 GPa and a tensile strength ranging from 3500 to 5600 MPa, preferably from 4500 to 5600 MPa to be substantially parallel to the longitudinal direction of the shaft.

Further, the tapered hollow shaft of this invention is characterized in that using low modulus carbon fibers having the compressive breaking strain of 1.7 to 5.0%, the tensile modulus of from 5 GPa to 160 GPa and the density of from 1.5 g/cm$^3$ to 1.9 g/cm$^3$, a reinforcing layer produced by orienting said low modulus carbon fibers to be substantially parallel to the longitudinal direction of the shaft is laminated on the side of the tip (thinner) portion of the shaft and on the outermost portion of the shaft, thereby restraining the rupture of the carbon fibers in the straight layer in the reinforced portion of the tip portion, which rupture is caused from the compressive side, to impart outstandingly superior impact resistance to the tip portion of the shaft and also impart the flexibility to the tip portion of the shaft.

The prepregs for use in the angle layer and straight layer may be cloth prepregs or unidirectional prepregs. Particularly, in view of easy controllability of the angle of orientation of the reinforcing fibers to the axial direction of the shaft, the unidirectional prepreg is more preferable for use.

The matrix resin to be employed in the prepregs for use in the angle layer and the straight layer, includes a thermosetting resin such as an epoxy resin, an unsaturated polyester, a phenol resin, a silicone resin, a polyurethane resin, a urea resin or a melamine resin. Among these thermosetting resins, an epoxy resin is preferable. These prepregs may be those having a weight per unit area of generally 30 to 180 g/m$^2$, preferably 50 to 150 g/m$^2$.

If the prepregs have a weight per unit area of more than 180 g/m$^2$, they will not only restrict the latitude of designing of the weight balance of a golf club shaft in which they are to be used, but also tend to undesirably exhibit their deteriorated windability around a mandrel at the time of preparing the club shaft.

The angle layer includes a positive angle layer portion in combination with a negative angle layer portion. The positive angle layer portions and the negative angle layer portions may be wound around a mandrel alternatively. The number of each of the positive and negative layer portions used for one-time alternate winding of the mandrel may be 1 or more.

In this specification, a prepreg which will be wound around a mandrel in the counterclockwise direction with respect to the axial direction of the mandrel from the thicker (rear) portion to the thinner (forward) portion thereof, is called a "positive angle layer portion," while a prepreg which will be wound around the mandrel in the clockwise direction with respect to said axial direction, is called a "negative angle layer portion."

The number of laminations of the angle layer including the positive and negative fibrous layer portions may be 1 to 10 in general, preferably 2 to 8. The total thickness of the angle layer(s) laminated may be different at the thinner portion of the shaft than at the thicker portion thereof, or may be constant at both the portions.

The expression of "the number of laminations" recited in this specification means how many of a particular layer such as the angle layer have been laminated around a mandrel for a shaft, i.e. the number of turns of the particular layer turned around the mandrel, although the number of laminations or turns can be a decimal fraction (a number between less than one and more than zero).

The straight layer used in this invention may be laminated or wound around a mandrel in such a manner that the orientation of the fibers in the prepreg composing of the straight layer is inclined generally at an angle of 0° to ±5° to the axial direction of a mandrel for a golf club shaft. The number of laminations of the straight layer may be 1 to 10 in general, preferably 2 to 8. The total thickness of the straight layer(s) laminated may be different at the thinner portion of the mandrel from at the thicker portion thereof, or may be constant at both the portions.

The reinforcing layer used in this invention using the low modulus carbon fibers plays a role of restraining the rupture of the straight layer, which is caused from the compressive side. Therefore, the reinforcing layer using the low modulus carbon fibers is preferably disposed at the outermost portion of the tip portion of the shaft, specifically, on the outside of the straight layer. Also, it is preferable to dispose the reinforcing layer using the low modulus carbon fibers at the outermost portion of the tip portion of the shaft with the view of restraining a rise in the flexural rigidity of the reinforced section.

The compressive breaking strain of the low modulus carbon fibers used in this invention ranges from 1.7 to 5.0% and preferably from 2.0 to 5.0%. If the carbon fibers have a compressive breaking strain of less than 1.7%, the flexural rupture, dominated by the compressive side, of the carbon fibers which are used for the straight layer and have a tensile modulus of 200 GPa to 460 GPa cannot be restrained, producing no effect on the improvement in the impact resistance of the shaft.

The tensile modulus of the low modulus carbon fibers used in this invention is in the range of 5 GPa to 160 Gpa, preferably 5 GPa to 150 GPa and more preferably 5 GPa to 120 GPa. If the carbon fibers used have a tensile modulus exceeding 160 GPa, the reinforced portion of the tip portion of the shaft does not possess sufficient flexibility.

The density of the low modulus carbon fibers used in this invention is in the range of 1.5 g/cm$^3$ to 1.9 g/cm$^3$, preferably 1.5 g/cm$^3$ to 1.85 g/cm$^3$ and more preferably 1.5 g/cm$^3$ to 1.8 g/cm$^3$. A density exceeding 1.9 g/cm$^3$ undesirably causes the shaft to increase in weight. Such carbon fibers may be polyacrylonitrile-based ones or pitch-based ones.

The reinforcing layer used in this invention using the low modulus carbon fibers may preferably cover a portion of the shaft extending from the tip end portion thereof up to the point that is 250 mm apart from the tip end at least, and a portion of the shaft extending from the tip end portion thereof up to the point that is 500 mm apart from the tip end at most.

When the reinforced portion covers up to the point that is less than 250 mm apart from the tip end portion of the shaft, this reinforcement undesirably has an insufficient effect on the improvement in the impact resistance of the tip portion of the shaft and imparts insufficient flexibility to the tip portion of the shaft.

Carbon fiber prepregs for forming the reinforcing layer at the thinner portion of the shaft therefrom may be cloth prepregs or unidirectional prepregs with the latter being preferable because of easy controllability of their orientation.

Matrix resins for use in the preparation of the carbon fiber-containing prepregs for constituting the reinforcing layers, include a thermosetting resin such as an epoxy resin, an unsaturated polyester, a phenol resin, a silicone resin, a polyurethane resin, a urea resin and a melamine resin, among which the epoxy resin is preferable. These prepregs may generally have a weight per unit area of 30 to 180 g/m$^2$, preferably 50 to 150 g/m$^2$ although they are not particularly limited in a weight per unit area.

The employment of these prepregs having over 180g/m$^2$ in weight per unit area is undesirable since the designing of the cutting shape of prepregs of the reinforcing layer and the weight balance thereof is liable to be restricted. It is possible to enhance the resulting shaft in flexural strength and flexibility by putting a reinforcing layer at the thinner portion on the angle layer or straight layer of the resulting shaft as explained below.

The reinforcing layer may be applied to the outermost layer in such a manner that the reinforcing layer covers a portion of the resulting shaft extending from the tip thereof up to at least ½₀, preferably at least ⅒, of the total length of the shaft. However, the occupying area of the reinforcing layer around the resulting shaft should not extend beyond ¾, preferably ⅔, more preferably ½, of the total length of the resulting shaft.

An excessive application of the reinforcing layer beyond the aforementioned upper limit of the occupying area is undesirable since not only the total weight of the resulting shaft is increased by the excessive application of the reinforcing layer, but also it will result in reinforcement of a shaft portion where such reinforcement is not required at all. On the other hand, if the application area of the reinforcing layer is less than the aforementioned lower limit of the occupying area, the thinner portion of the resulting shaft can not sufficiently be improved in flexural strength.

If the reinforcing layer is applied to the outer peripheral surface of the straight layer, it is desirably possible to minimize the increment of the flexural rigidity of the thinner portion of the resulting shaft substantially without increasing the outer diameter of the resulting shaft.

The reinforcing layer is laminated while the reinforcing fibers therein are made oriented so as to be almost parallel with the axis of the resulting shaft or be inclined at an angle of 0° to ±5° to the axial direction thereof. The number of laminations of the reinforcing layer may be varied between 1 and 10 depending on the purpose for which it is used. The number of laminations of the reinforcing layer may be decreased to 0 to 4 at the thicker portion of the resulting shaft, while the number of laminations at the thinner portion thereof may be 1 to 10. Alternatively, the number of laminations of the reinforcing layer may be decreased to 0 to 4 at the thinner portion, while the number of laminations at the thicker portion is 1 to 10.

A prepreg to be employed for the reinforcing layer may be divided into 1 to 5 portion of the same or different form for lamination.

When the tapered hollow shaft for a golf shaft according to this invention is used in a wood club shaft, it is preferable that impact absorption energy measured by an impact test for the reinforced portion of the tip portion of the shaft be in the range of 5.5 J to 20 J, the flexural rigidity of a tip portion covering a portion of the shaft extending from the tip end portion of the shaft up to the point that is 300 mm apart from the tip end portion be in the range of $0.8 \times 10^7$ N·mm$^2$ to less than $3.0 \times 10^7$ N·mm$^2$ and the flexibility rate of backward flexibility/forward flexibility be in the range of 1.05 to 1.50.

Also, when the tapered hollow shaft for a golf shaft according to this invention is used in a wood club shaft, preferably it has, in addition to the above characteristics, the weight in the range of 40 g to 65 g, the length of the shaft in the range of 1016 mm to 1220 mm, the outer diameter of the shaft at the tip end portion of the shaft in the range of 8.2 mm to 9.5 mm and the outer diameter of the butt end portion of the shaft in the range of 14.5 mm to 18 mm.

When the tapered hollow shaft for a golf shaft according to this invention is used as an iron club shaft, it is desirable that the impact absorption energy measured by an impact test for the reinforced portion of the tip end portion of the shaft be in the range of 6.5 J to 25 J, the flexural rigidity of a tip portion covering a portion of the shaft extending from the tip end portion of the shaft up to the point that is 300 mm apart from the tip end portion of the shaft be in the range of $1.5 \times 10^7$ N·mm$^2$ to less than $5.0 \times 10^7$ N·mm$^2$ and the flexibility rate of backward flexibility/forward flexibility be in the range of 1.00 to 1.50.

Also, when the tapered hollow shaft for a golf shaft according to this invention is used in an iron club shaft, preferably it has, in addition to the above characteristics, the weight in the range of 60 g to 85 g, the length of the shaft in the range of 860 mm to less than 1016 mm, the outer diameter of the shaft at the tip end portion of the shaft in the range of 9.2 mm to 10.5 mm and the outer diameter of the butt end portion of the shaft in the range of 14.5 mm to 18 mm.

This invention will be further explained with reference to the following examples which should not be construed as limiting this invention.

EXAMPLES

In the accompanying drawings, reference numeral 1 indicates a mandrel; numeral 2 indicates an angle layer (numeral 2a indicates a positive angle layer, numeral 2b indicates a negative angle layer); numeral 3 indicates a straight layer; numeral 4(4a, 4b and 4c) indicates a reinforcing layer; numeral 5 indicates a shaft formed; numeral 6 indicates a tip section separated from the shaft; numeral 7 indicates an impact hammer and numeral 8 indicates a support base.

Tapered hollow shafts were formed using the reinforcing fibers and according to the lamination method each described in Table 1 and Table 2. The mandrels with a tip diameter of 3.75 mm and a length of 1600 mm were used in Examples 1–4 and Comparative Examples 1–6 and the mandrels with a tip diameter of 3.00 mm and a length of 1500 mm were used in Examples 5–7 and Comparative Examples 7–9. The details of each mandrel used in Examples and Comparative Examples are listed in Table 3.

More detailed forming method will be hereinafter illustrated.

Figure 2:
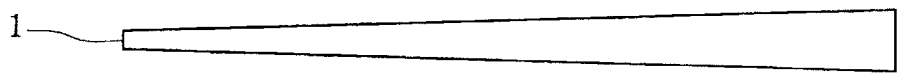
FIG. 2(a) shows a plan view of a mandrel.
FIG. 2(b) shows a section of a positive angle layer portion.
FIG. 2(c) shows a section of a negative angle layer portion.
FIG. 2(d) shows a section of a straight layer.
FIG. 2(e) shows a section of a reinforcing layer extending from a tip end of the shaft to a point that is 500 mm apart from the tip end.
FIG. 2(f) shows a section of a reinforcing layer extending from a tip end of the shaft to a point that is 150 mm apart from the tip end.
FIG. 2(g) is a schematic cross-sectional view of a final laminated structure of a shaft.
Figure 2:
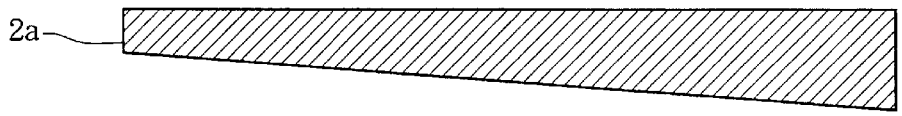
Figure 2:
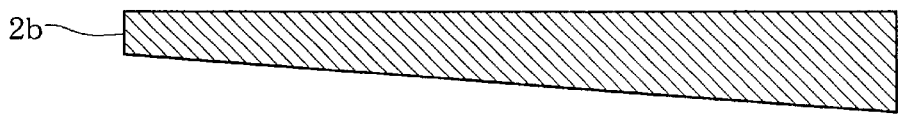
Figure 2:
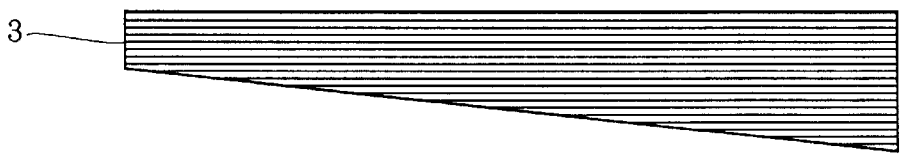
Figure 2:
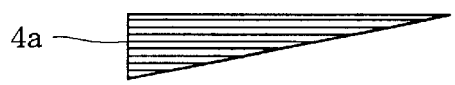
Figure 2:
Figure 2:
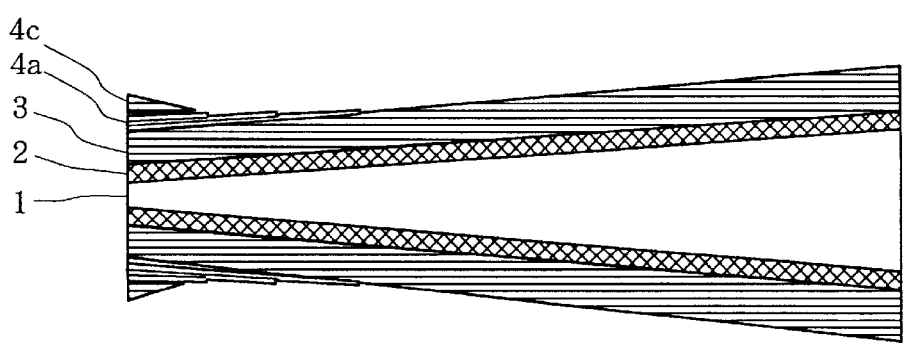

The tapered hollow shafts of Examples 1, 2 and 5, and of Comparative Examples 1–3 were formed as shown in FIG. 2.

Figure 3:
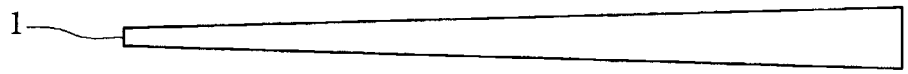
FIG. 3(a) shows a plan view of a mandrel.
FIG. 3(b) shows a section of a positive angle layer portion.
FIG. 3(c) shows a section of a negative angle layer portion.
FIG. 3(d) shows a section of a straight layer.
FIG. 3(e) shows a section of a reinforcing layer extending from a tip end of the shaft to a point that is 500 mm apart from the tip end.
FIG. 3(f) shows a section of a reinforcing layer extending from a tip end of the shaft to a point that is 400 mm apart from the tip end.
FIG. 3(g) shows a section of a reinforcing layer extending from a tip end of the shaft to a point that is 150 mm apart from the tip end.
FIG. 3(h) is a schematic cross-sectional view of a final laminated structure of a shaft.
Figure 3:
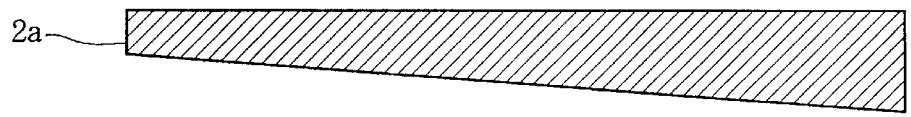
Figure 3:
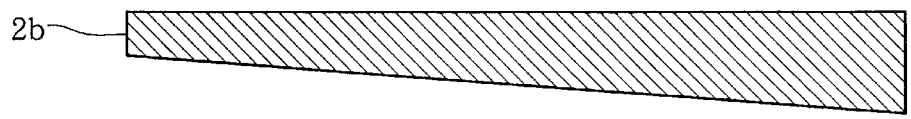
Figure 3:
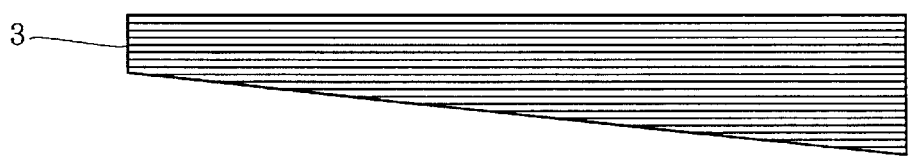
Figure 3:
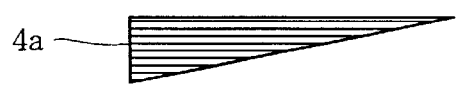
Figure 3:
Figure 3:
Figure 3:
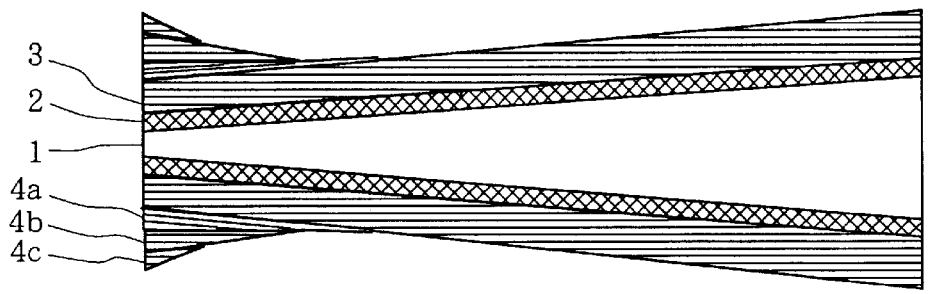

The tapered hollow shafts of Examples 3, 4, 6 and 7, and of Comparative Examples 4–9 were formed as shown in FIG. 3.

Example 1

In this case, a shaft was constituted of in the order a mandrel 1, an angle layer 2 consisting essentially of a positive angle layer 2a and a negative angle layer 2b, a straight layer 3, a tip portion-reinforcing layer 4a and a tip portion-reinforcing layer 4c toward the outside of the shaft.

The procedures for forming a shaft as shown in FIG. 2 will be explained below.

Wax was applied to the mandrel to improve the mandrel in releasability from the shaft formed.

The information about mandrels used and the prepreg lamination range are described in Table 3. The thickness differed depending upon the types of prepreg. Hence in order to keep the outer diameter of the shaft constant, the mandrels used were slightly different from each other and the ranges in which the prepregs were wound around the mandrel were slightly different from each other.

As an angle layer, a prepreg of P9055F-11 (trade name; carbon fiber M40J (trade name, PAN-based carbon fibers); matrix resin #2500 (trade name, an epoxy resin cured at 250° F.); carbon fiber weight per unit area of 100 g/m$^2$; epoxy resin content of 25% by weight; produced by Toray Industries, Inc.) was employed.

Further, as a straight layer, a prepreg of P3052S-12 (trade name; carbon fiber T700S (trade name, PAN-based carbon fibers); matrix resin #2500 (trade name, an epoxy resin cured at 250° F.); carbon fiber weight per unit area of 125 g/m$^2$; epoxy resin content of 33% by weight; produced by Toray Industries, Inc.) was employed.

Further, as a reinforcing layer, a prepreg of E0526A-10 (trade name; carbon fiber XN-05 (trade name, pitch-based carbon fibers); matrix resin 25P (trade name, an epoxy resin cured at 250° F.); carbon fiber weight per unit area of 100 g/m$^2$; epoxy resin content of 35% by weight; produced by Nippon Graphite Fiber Co.) was employed.

Figure 4:
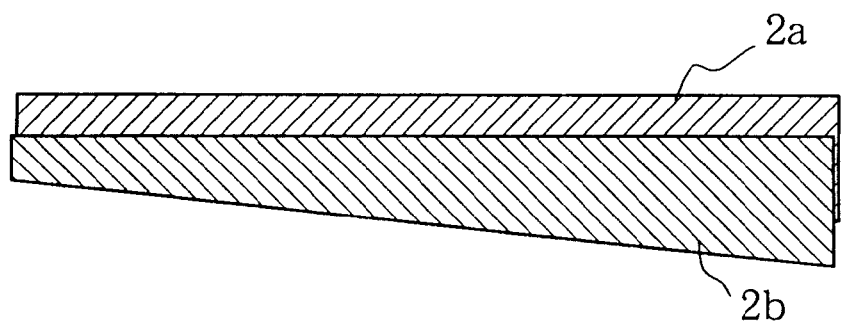
FIG. 4 is a view wherein two different angle layer prepregs are partially overlapped each other.

Firstly, a prepreg of an angle layer produced by overlapping a positive angle layer prepreg 2a and a negative angle layer prepreg 2b each other was wound around the mandrel, covering a specified range extending from the tip end portion of the mandrel. It is noted that each of the positive and negative layer prepregs 2a and 2b was cut into a trapezoid so that carbon fibers contained were oriented to incline at angles of +45° and −45° respectively to the longitudinal direction of the shaft, in such a size that thus cut prepregs would be 1244 mm long in the longitudinal direction of the shaft and that thus cut prepregs of the positive angle layer prepreg 2a and negative angle layer prepreg 2b would be able to wind the mandrel two times, respectively, thus amounting to four rounds as the total rounds of both layers, in the range of the tip end to the butt end of the shaft. Then, as shown in FIG. 4, thus cut prepregs were partially overlapped each other by shifting one prepreg from the other by a distance corresponding to a half circumference of the mandrel and then laminated on the mandrel to form an angle layer which is composed of a positive angle layer (from the prepreg containing plus 45° angled carbon fibers) and a negative angle layer (from the prepreg containing minus 45° angled carbon fibers).

The prepreg of the straight layer 3 was cut into a trapezoid so that carbon fibers contained were oriented to be substantially parallel to the longitudinal direction of the shaft, in such a size that thus cut prepreg would be 1244 mm long in the longitudinal direction of the shaft and that thus cut prepreg would be able to wind the mandrel three times, in the range of the tip end to the butt end of the shaft. Then the thus cut prepreg was laminated on the angle layer to form a straight layer thereon.

Further, the prepreg of the tip portion-reinforcing layer 4a was cut into a triangle so that reinforcing fibers contained were oriented to be substantially parallel to the longitudinal direction of the shaft, in such a size that thus cut prepreg would be 500 mm long from the tip end toward the butt side of the shaft and that the thus cut prepreg would be able to wind the mandrel three times at the tip end portion of the shaft and zero at the position that was 500 mm apart from the tip end portion of the shaft toward the butt side. Then the thus cut prepreg was laminated on the straight layer 3 to form a tip portion-reinforcing layer 4a, covering the tip portion of the shaft.

Finally, the prepreg of the tip portion-reinforcing layer 4c was cut into a triangle so that the carbon fibers contained were oriented to be substantially parallel to the longitudinal direction of the shaft, in such a size that thus cut prepreg would be 150 mm long from the tip end toward the butt side of the shaft and that the thus cut prepreg would be able to wind the mandrel 2.5 times at the tip end portion of the shaft and zero at the position that was 150 mm apart from the tip end portion of the shaft toward the butt side. Then the thus cut prepreg was laminated on the tip portion-reinforcing layer 4a to form a tip portion-reinforcing layer 4c, covering the tip portion of the shaft to obtain a laminate body on the mandrel.

The thus obtained laminate body on the mandrel was wound with a shrinkable tape and then heated to 130° C. for defoaming and curing. Then the mandrel was pulled from the thus cured laminate body and further the tip end portion side and the butt end portion side were cut down respectively by 50 mm to obtain a 1144 mm long tapered hollow shaft for a golf shaft. The shaft thus formed was 8.49 mm in outer diameter of the tip end, 5.95 mm in inner diameter of the tip end, 15.06 mm in outer diameter of the butt end and 13.65 mm in inner diameter of the butt end.

Example 2

A shaft was manufactured in the same manner as explained in Example 1 except that a prepreg for forming a reinforcing layer employed in Example 2 was made of E1526C-10 (trade name; carbon fiber XN-15 (trade name, pitch-based carbon fibers); matrix resin 25P (trade name, an epoxy resin cured at 250° F.); carbon fiber weight per unit area of 100 g/m$^2$; epoxy resin content of 33% by weight; produced by Nippon Graphite Fiber Co.).

The shaft formed was 1144 mm long, 8.52 mm in outer diameter of the tip end, 6.00 mm in inner diameter of the tip end, 15.11 mm in outer diameter of the butt end and 13.70 mm in inner diameter of the butt end.

Example 3

In this case, a shaft was constituted of in the order a mandrel 1, an angle layer 2 consisting essentially of a positive angle layer 2a and a negative angle layer 2b, a straight layer 3, a tip portion-reinforcing layer 4a, a tip portion-reinforcing layer 4b and a tip portion-reinforcing layer 4c toward the outside of the shaft.

The procedures for forming a shaft as shown in FIG. 3 will be explained below.

Wax was applied to the mandrel to improve the mandrel in releasability from the shaft formed.

As an angle layer, a prepreg of P9055F-11 was employed.

Further, as a straight layer, a prepreg of P2053F-12 (trade name; carbon fiber T800H (trade name, PAN-based carbon fibers, a tensile modulus of 294 GPa, a tensile strength of 5490 MPa); matrix resin #2500 (trade name, an epoxy resin cured at 250° F.); carbon fiber weight per unit area of 125 g/m$^2$; epoxy resin content of 30% by weight; produced by Toray Industries, Inc.) was employed.

Further, as a reinforcing layer, a prepreg of E0526A-10 was employed.

Firstly, a prepreg of an angle layer produced by overlapping a positive angle layer prepreg 2a and a negative angle layer prepreg 2b each other was wound around the mandrel, covering a specified range extending from the tip end portion of the mandrel It is noted that each of the positive and negative layer prepregs 2a and 2b was cut into a trapezoid so that carbon fibers contained were oriented to incline at angles of +45° and −45° respectively to the longitudinal direction of the shaft, in such a size that thus cut prepregs would be 1244 mm long in the longitudinal direction of the shaft and that thus cut prepregs of the positive angle layer prepreg 2a and negative angle layer prepreg 2b would be able to wind the mandrel three times, respectively, thus amounting to six rounds as the total rounds of both layers, in the range of the tip end to the butt end of the shaft. Then, as shown in FIG. 4, thus cut prepregs were partially overlapped each other by shifting one prepreg from the other by a distance corresponding to a half circumference of the mandrel and then laminated on the mandrel to form an angle layer which is composed of a positive angle layer (from the prepreg containing plus 45° angled carbon fibers) and a negative angle layer (from the prepreg containing minus 45° angled carbon fibers).

The prepreg of the straight layer 3 was cut into a trapezoid so that carbon fibers contained were oriented to be substantially parallel to the longitudinal direction of the shaft, in such a size that thus cut prepreg would be 1244 mm long in the longitudinal direction of the shaft and that thus cut prepreg would be able to wind the mandrel four times, in the range of the tip end to the butt end of the shaft. Then the thus cut prepreg was laminated on the angle layer to form a straight layer thereon.

Further, the prepreg of the tip portion-reinforcing layer 4a was cut into a triangle so that reinforcing fibers contained were oriented to be substantially parallel to the longitudinal direction of the shaft, in such a size that thus cut prepreg would be 500 mm long in the range of the tip end to the butt end of the shaft and that the thus cut prepreg would be able to wind the mandrel five times at the tip end portion of the shaft and zero at the position that was 500 mm apart from the tip end portion of the shaft toward the butt side. Then the thus cut prepreg was laminated on the straight layer 3 to form a tip portion-reinforcing layer 4a, covering the tip portion of the shaft.

The prepreg of the tip portion-reinforcing layer 4b was cut into a triangle so that the carbon fibers contained were oriented to be substantially parallel to the longitudinal direction of the shaft, in such a size that thus cut prepreg would be 400 mm long in the range of the tip end to the butt end of the shaft and that the thus cut prepreg would be able to wind the mandrel two times at the tip end portion of the shaft and zero at the position that was 400 mm apart from the tip end portion of the shaft toward the butt side. Then the thus cut prepreg was laminated on the tip portion-reinforcing layer 4a to form a tip portion-reinforcing layer 4b, covering the tip portion of the shaft.

Finally, the prepreg of the tip portion-reinforcing layer 4c was cut into a triangle so that the carbon fibers contained were oriented to be substantially parallel to the longitudinal direction of the shaft, in such a size that thus cut prepreg would be 150 mm long in the range of the tip end to the butt end of the shaft and that the thus cut prepreg would be able to wind the mandrel two times at the tip end portion of the shaft and zero at the position that was 150 mm apart from the tip end portion of the shaft toward the butt side Then the thus cut prepreg was laminated on the tip portion-reinforcing layer 4b to form a tip portion-reinforcing layer 4c, covering the tip portion of the shaft to obtain a laminate body on the mandrel.

The thus obtained laminate body on the mandrel was wound with a shrinkable tape and then heated to 130° C. for defoaming and curing. Then the mandrel was pulled from the thus cured laminate body and further the tip end portion side and the butt end portion side were cut down respectively by 50 mm to obtain a 1144 mm long tapered hollow shaft for a golf shaft. The shaft thus formed was 8.54 mm in outer diameter of the tip end, 4.76 mm in inner diameter of the tip end, 15.01 mm in outer diameter of the butt end and 13.65 mm in inner diameter of the butt end.

Example 4

A shaft was manufactured in the same manner as explained in Example 3 except that a prepreg for forming a reinforcing layer employed in Example 4 was made of E1526C-10. The shaft formed was 1144 mm, 8.47 mm in outer diameter of the tip end, 4.87 mm in inner diameter of the tip end, 15.12 mm in outer diameter of the butt end and 13.19 mm in inner diameter of the butt end.

Example 5

The procedures for forming a shaft as shown in FIG. 2 will be explained below.

Wax was applied to the mandrel to improve the mandrel in releasability from the shaft formed.

As an angle layer, a prepreg of P9055F-13 (trade name; carbon fiber M40J (trade name, PAN-based carbon fibers); matrix resin #2500 (trade name, an epoxy resin cured at 250° F.); carbon fiber weight per unit area of 125 g/m$^2$; epoxy resin content of 25% by weight; produced by Toray Industries, Inc.) was employed.

Further, as a straight layer, a prepreg of P3052S-12 was employed.

Further, as a reinforcing layer, a prepreg of E0526A-10 was employed.

Firstly, a prepreg of an angle layer produced by overlapping a positive angle layer prepreg 2a and a negative angle layer prepreg 2b each other was wound around the mandrel, covering a specified range extending from the tip end portion of the mandrel. It is noted that each of the positive and negative layer prepregs 2a and 2b was cut into a triangle so that carbon fibers contained were oriented to incline at angles of +45° and -45° respectively to the longitudinal direction of the shaft, in such a size that thus cut prepregs would be 1065 mm long in the longitudinal direction of the shaft and that thus cut prepregs of the positive angle layer prepreg 2a and negative angle layer prepreg 2b would be able to wind the mandrel four times respectively at the tip end portion of the shaft and two times at the position that was 1065 mm apart from the tip end portion of the shaft toward the butt side. Then, thus cut prepregs were partially overlapped each other by shifting one prepreg from the other by a distance corresponding to a half circumference of the mandrel and then laminated on the mandrel to form an angle layer which is composed of a positive angle layer (from the prepreg containing plus 45° angled carbon fibers) and a negative angle layer (from the prepreg containing minus 45° angled carbon fibers).

The prepreg of the straight layer 3 was cut into a trapezoid so that carbon fibers contained were oriented to be substantially parallel to the longitudinal direction of the shaft, in such a size that thus cut prepreg would be 1065 mm long in the longitudinal direction of the shaft and that thus cut prepreg would be able to wind the mandrel four times, in the range of the tip end to the butt end of the shaft. Then the thus cut prepreg was laminated on the angle layer to form a straight layer thereon.

Further, the prepreg of the tip portion-reinforcing layer 4a was cut into a triangle so that reinforcing fibers contained were oriented to be substantially parallel to the longitudinal direction of the shaft, in such a size that thus cut prepreg would be 500 mm long from the tip end toward the butt side of the shaft and that the thus cut prepreg would be able to wind the mandrel three times at the tip end portion of the shaft and zero at the position that was 500 mm apart from the tip end portion of the shaft toward the butt side. Then the thus cut prepreg was laminated on the straight layer 3 to form a tip portion-reinforcing layer 4a, covering the tip portion of the shaft.

Finally, the prepreg of the tip portion-reinforcing layer 4c was cut into a triangle so that the carbon fibers contained were oriented to be substantially parallel to the longitudinal direction of the shaft, in such a size that thus cut prepreg would be 150 mm long from the tip end toward the butt side of the shaft and that the thus cut prepreg would be able to wind the mandrel two times at the tip end portion of the shaft and zero at the position that was 150 mm apart from the tip end portion of the shaft toward the butt side. Then the thus cut prepreg was laminated on the tip portion-reinforcing layer 4a to form a tip portion-reinforcing layer 4c, covering the tip portion of the shaft to obtain a laminate body on the mandrel.

The thus obtained laminate body on the mandrel was wound with a shrinkable tape and then heated to 130° C. for defoaming and curing. Then the mandrel was pulled from the thus cured laminate body to obtain a tapered hollow shaft for a golf shaft. The shaft thus formed was 9.45 mm in outer diameter of the tip end, 15.28 mm in outer diameter of the butt end.

Example 6

The procedures for forming a shaft as shown in FIG. 3 will be explained below.

Wax was applied to the mandrel to improve the mandrel in releasability from the shaft formed.

As an angle layer, a prepreg of P9055F-13 was employed. Further, as a straight layer, a prepreg of P2053F-12 was employed.

Further, as a reinforcing layer, a prepreg of E0526A-10 was employed.

Firstly, a prepreg of an angle layer produced by overlapping a positive angle layer prepreg 2a and a negative angle layer prepreg 2b each other was wound around the mandrel, covering a specified range extending from the tip end portion of the mandrel. It is noted that each of the positive and negative layer prepregs 2a and 2b was cut into a triangle so that carbon fibers contained were oriented to incline at angles of +45° and -45° respectively to the longitudinal direction of the shaft, in such a size that thus cut prepregs would be 1065 mm long in the longitudinal direction of the shaft and that thus cut prepregs of the positive angle layer prepreg 2a and negative angle layer prepreg 2b would be able to wind the mandrel five times respectively at the tip end portion of the shaft and three times at the position that was 1065 mm apart from the tip end portion of the shaft toward the butt side. Then, thus cut prepregs were partially overlapped each other by shifting one prepreg from the other by a distance corresponding to a half circumference of the mandrel and then laminated on the mandrel to form an angle layer which is composed of a positive angle layer (from the prepreg containing plus 45° angled carbon fibers) and a negative angle layer (from the prepreg containing minus 45° angled carbon fibers).

The prepreg of the straight layer 3 was cut into a trapezoid so that carbon fibers contained were oriented to be substantially parallel to the longitudinal direction of the shaft, in such a size that thus cut prepreg would be 1065 mm long in the longitudinal direction of the shaft and that thus cut prepreg would be able to wind the mandrel five times, in the range of the tip end to the butt end of the shaft. Then the thus cut prepreg was laminated on the angle layer to form a straight layer thereon.

Further, the prepreg of the tip portion-reinforcing layer 4a was cut into a triangle so that reinforcing fibers contained were oriented to be substantially parallel to the longitudinal direction of the shaft, in such a size that thus cut prepreg would be 500 mm long from the tip end toward the butt side of the shaft and that the thus cut prepreg would be able to wind the mandrel five times at the tip end portion of the shaft and zero at the position that was 500 mm apart from the tip end portion of the shaft toward the butt side. Then the thus cut prepreg was laminated on the straight layer 3 to form a tip portion-reinforcing layer 4a, covering the tip portion of the shaft.

The prepreg of the tip portion-reinforcing layer 4b was cut into a triangle so that the carbon fibers contained were oriented to be substantially parallel to the longitudinal direction of the shaft, in such a size that thus cut prepreg would be 400 mm long from the tip end toward the butt side of the shaft and that the thus cut prepreg would be able to wind the mandrel two times at the tip end portion of the shaft and zero at the position that was 400 mm apart from the tip end portion of the shaft toward the butt side. Then the thus cut prepreg was laminated on the tip portion-reinforcing layer 4a to form a tip portion-reinforcing layer 4b, covering the tip portion of the shaft.

Finally, the prepreg of the tip portion-reinforcing layer 4c was cut into a triangle so that the carbon fibers contained were oriented to be substantially parallel to the longitudinal direction of the shaft, in such a size that thus cut prepreg would be 150 mm long from the tip end toward the butt side of the shaft and that the thus cut prepreg would be able to wind the mandrel 1.5 times at the tip end portion of the shaft and zero at the position that was 150 mm apart from the tip end portion of the shaft toward the butt side. Then the thus cut prepreg was laminated on the tip portion-reinforcing layer 4b to form a tip portion-reinforcing layer 4c, covering the tip portion of the shaft to obtain a laminate body on the mandrel.

The thus obtained laminate body on the mandrel was wound with a shrinkable tape and then heated to 130° C. for defoaming and curing. Then the mandrel was pulled from the thus cured laminate body to obtain a tapered hollow shaft for a golf shaft. The outer diameters of the tip end and the butt end of the shaft are shown in Table 4.

Example 7

A shaft was manufactured in the same manner as explained in Example 6 except that a prepreg for forming an angle layer employed in Example 7 was made of P9055F-11 and that a prepreg for forming a reinforcing layer was made of E1526C-10. The outer diameters of the tip end and the butt end of the shaft formed are shown in Table 4.

Comparative Example 1

A shaft was manufactured in the same manner as explained in Example 1 except that a prepreg for forming a reinforcing layer was made of P3052S-12.

Comparative Example 2

A shaft was manufactured in the same manner as explained in Example I except that a prepreg for forming a reinforcing layer was made of a unidirectional fiberglass prepreg and that the prepreg of the tip portion-reinforcing layer 4c was cut in such a size that the thus cut prepreg would be able to wind the mandrel 3.5 times at the tip end portion of the shaft and zero at the position that was 150 mm apart from the tip end portion of the shaft toward the butt side.

Comparative Example 3

A shaft was manufactured in the same manner as explained in Example 1 except that a prepreg for forming a reinforcing layer was made of a unidirectional aramid fiber prepreg and that the prepreg of the tip portion-reinforcing layer 4c was cut in such a size that the thus cut prepreg would be able to wind the mandrel two times at the tip end portion of the shaft and zero at the position that was 150 mm apart from the tip end portion of the shaft toward the butt side.

Comparative Example 4

A shaft was manufactured in the same manner as explained in Example 3 except that a prepreg for forming a reinforcing layer was made of P3052S-12.

Comparative Example 5

A shaft was manufactured in the same manner as explained in Example 3 except that a prepreg for forming a reinforcing layer was made of a unidirectional fiberglass prepreg and that the prepreg of the tip portion-reinforcing layer 4c was cut in such a size that the thus cut prepreg would be able to wind the mandrel three times at the tip end portion of the shaft and zero at the position that was 150 mm apart from the tip end portion of the shaft toward the butt side.

Comparative Example 6

A shaft was manufactured in the same manner as explained in Example 3 except that a prepreg for forming a reinforcing layer was made of a unidirectional aramid fiber prepreg and that the prepreg of the tip portion-reinforcing layer 4c was cut in such a size that the thus cut prepreg would be able to wind the mandrel 1.5 times at the tip end portion of the shaft and zero at the position that was 150 mm apart from the tip end portion of the shaft toward the butt side.

Comparative Example 7

A shaft was manufactured in the same manner as explained in Example 7 except that a prepreg for forming an angle layer was made of P9055F-13, and a prepreg for forming a reinforcing layer was made of P3052S-12 and that the prepreg of the tip portion-reinforcing layer 4c was cut in such a size that the thus cut prepreg would be able to wind the mandrel two times at the tip end portion of the shaft and zero at the position that was 150 mm apart from the tip end portion of the shaft toward the butt side.

Comparative Example 8

A shaft was manufactured in the same manner as explained in Comparative Example 7 except that a prepreg for forming a reinforcing layer was made of a unidirectional fiberglass prepreg.

Comparative Example 9

A shaft was manufactured in the same manner as explained in Comparative Example 7 except that a prepreg for forming a reinforcing layer was made of a unidirectional aramid fiber prepreg and that the prepreg of the tip portion-reinforcing layer 4c was cut in such a size that the thus cut prepreg would be able to wind the mandrel once at the tip end portion of the shaft and zero at the position that was 150 mm apart from the tip end portion of the shaft toward the butt side.

Evaluation of the Performance of the Shaft Formed

The tapered hollow shafts obtained in the Examples and Comparative Examples were measured for various qualities (weight, shape, flexibility, flexural rigidity and impact properties).

Figure 7:
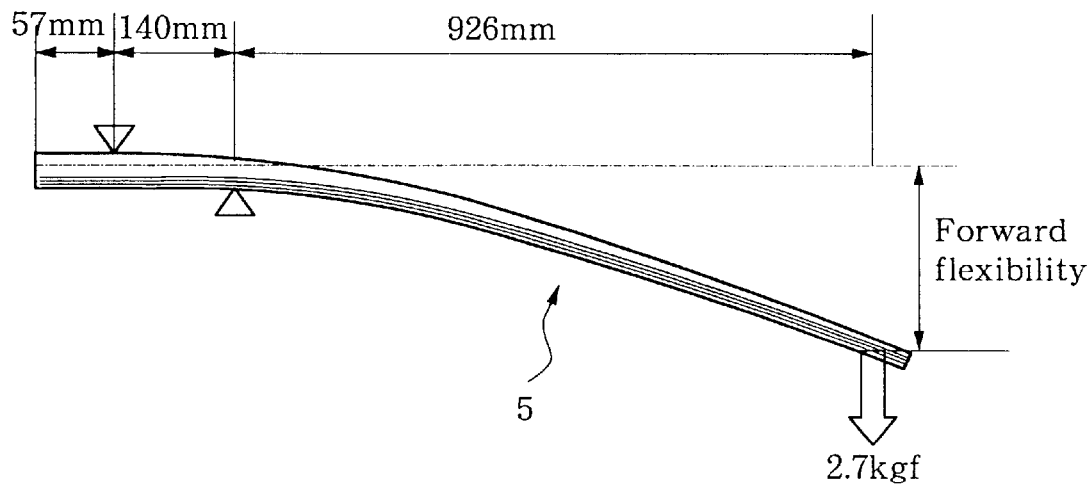
FIG. 7(a) shows a method of measuring the forward flexibility of a shaft.
FIG. 7(b) shows a method of measuring the backward flexibility of a shaft.
Figure 7:
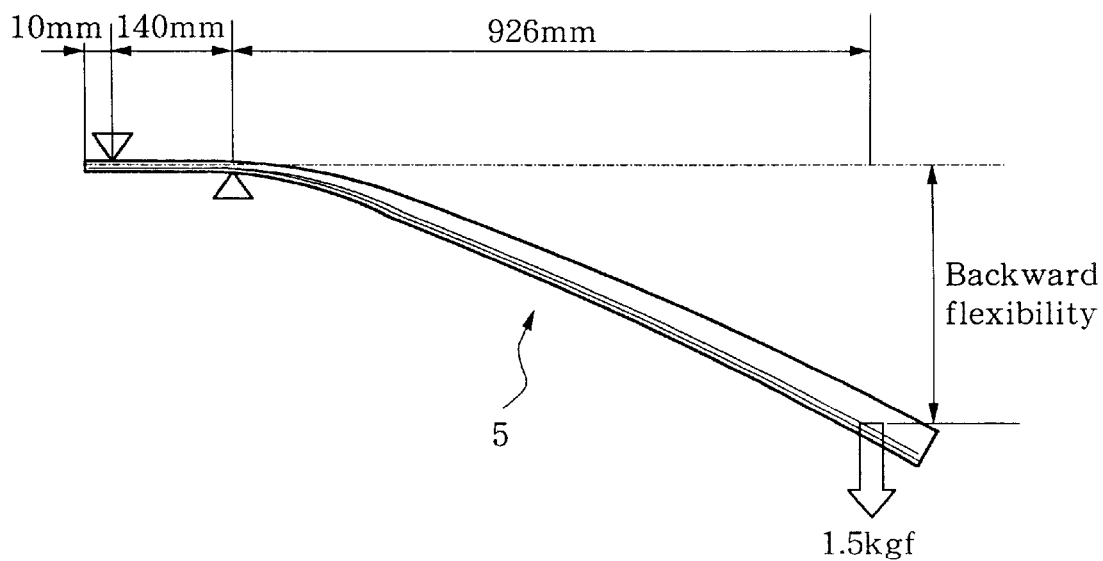

FIG. 7 shows a method of measuring the flexibility of the shaft of this invention. The forward flexibility was measured in the following procedures.

The thicker portion of the shaft was supported at two different points. One point that was 57 mm apart from the end of the thicker portion was supported downward, and other point that was 197 mm apart from the end of the thicker portion was supported upward. The shaft was set on the measuring machine horizontally. Then, the weight of 2.7 kg was loaded at the point that was 1123 mm apart from the butt end portion side of the shaft to be used for a wood club shaft, and the weight of 2.7 kg was loaded at the point that was 945 mm apart from the butt end portion side of the shaft to be used for an iron club shaft. The vertical displacement of the loaded point was defined as forward flexibility.

The backward flexibility was measured in the following procedures.

The thinner portion of the shaft was supported at two different points. One point that was 10 mm apart from the end of the thinner portion was supported downward, and other point that was 150 mm apart from the end of the thinner portion was supported upward. The shaft was set on the measuring machine horizontally. Then, the weight of 1.5 kg was loaded at the point that was 1076 mm apart from the tip end portion side of the shaft to be used for a wood club shaft, and the weight of 1.5 kg was loaded at the point that was 898 mm apart from the tip end portion side of the shaft to be used for an iron club shaft. The vertical displacement of the loaded point was defined as backward flexibility.

Figure 5:
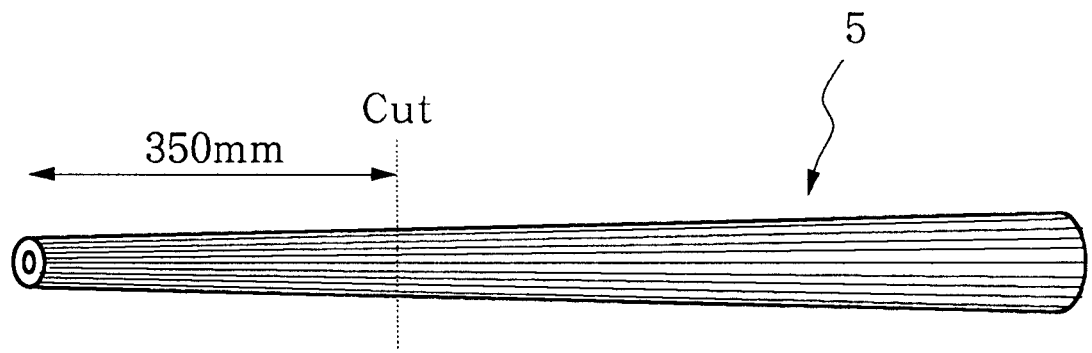
FIG. 5 is a view of a shaft with a cut point shown.

Moreover, in this invention, the shaft was cut at the position that was 350 mm apart from the tip end portion to obtain a tip section. The thus obtained tip section (350 mm long) was measured for the impact properties (see FIG. 5).

Figure 6:
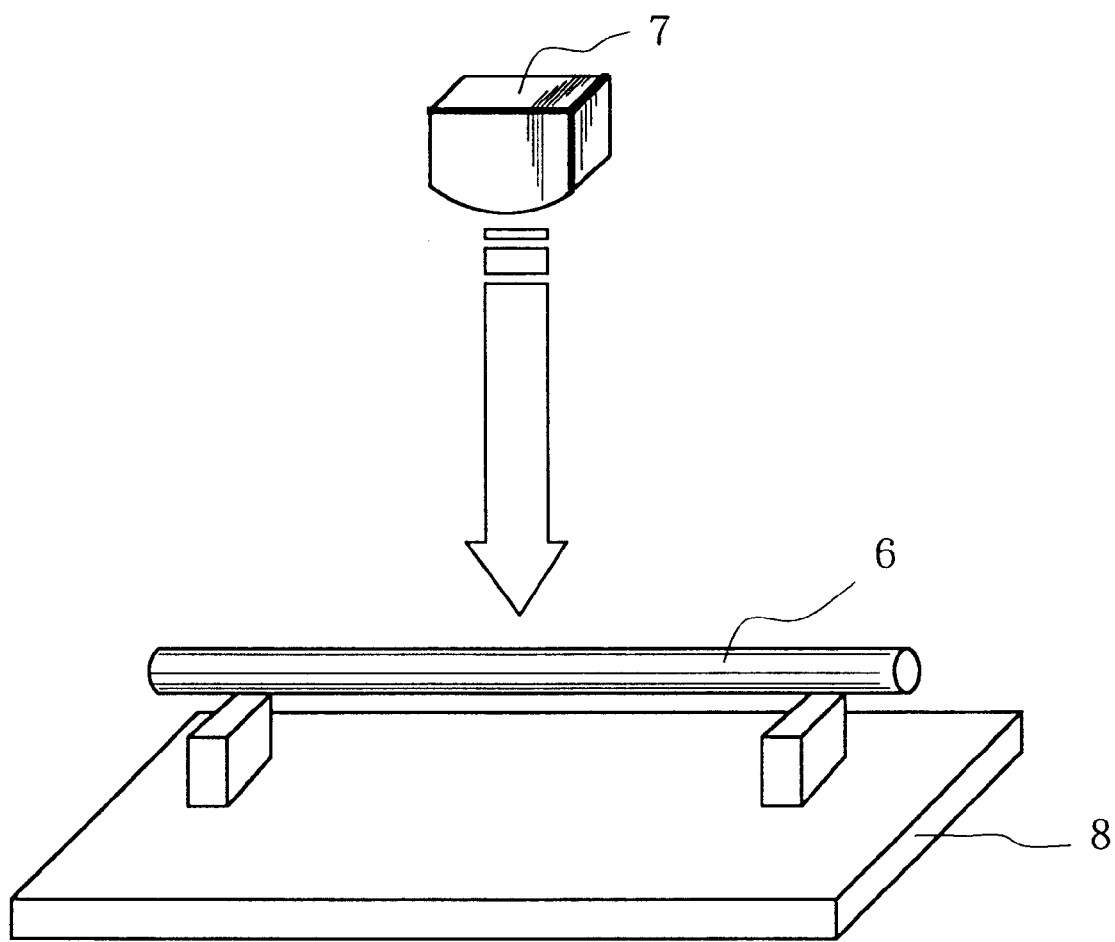
FIG. 6 shows a drop impact tester on which a tip section of a shaft is placed.

For the evaluation of the impact properties of the tip section, a drop impact tester was used (see FIG. 6). The tip section 6 obtained was placed on a support base 8 in which a support had a form of 12R and the support span was 300 mm. An impact hammer 7 weighing 766 g with an impact nose having a form of 75R was dropped from the point that was 1600 mm high above the tip section 6 to the tip section 6 to apply impact stress to the tip section 6.

The speed of the impact hammer 7 when it collided against the tip section 6 was 5.4 m/sec. Further, the impact hammer 7 was equipped with an accelerometer (not shown) to measure the impact bending load (fracture load) generated in the tip section 6 and the deflection of the tip section 6 during the impact test was carried out and the impact absorption energy of the tip section 6 was determined from the relation between these properties.

Figure 8:
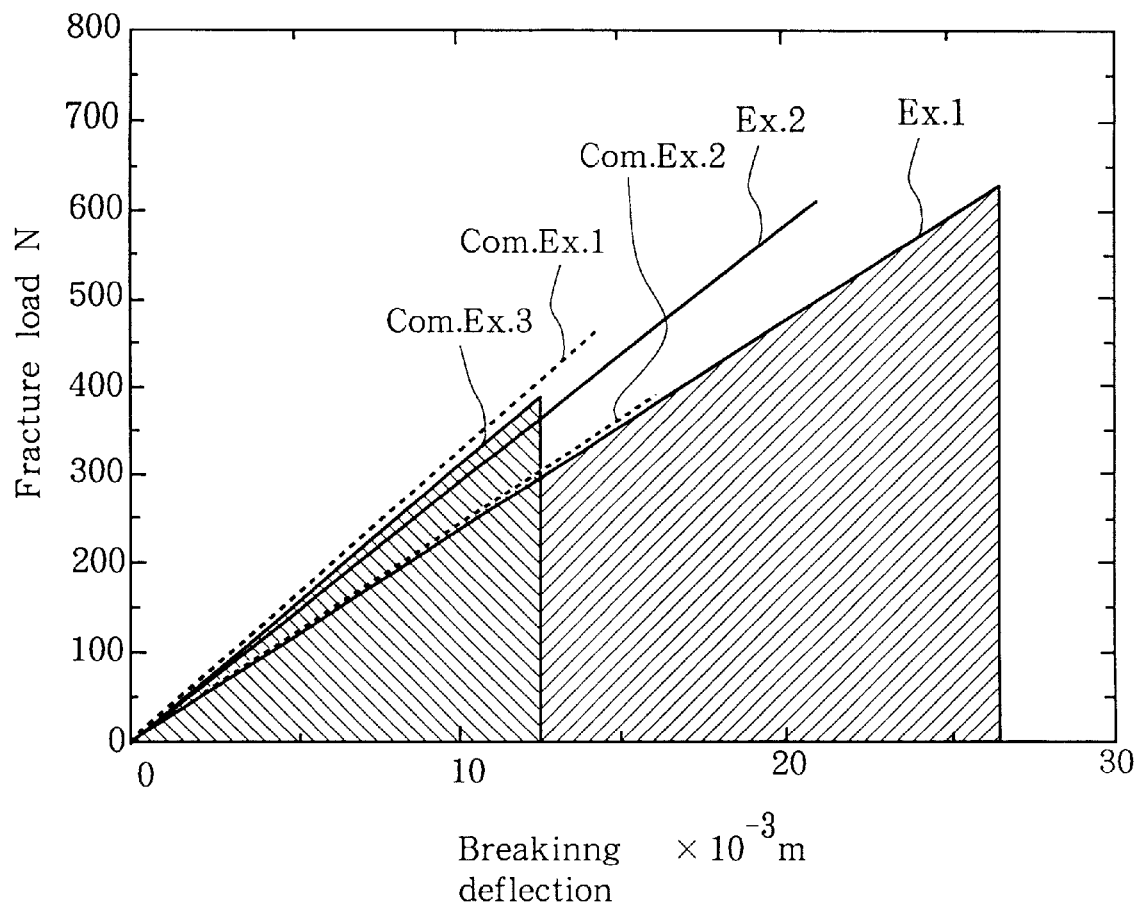
FIG. 8 is a schematic graph showing relation between fracture load and breaking deflection of shafts for use in iron club shafts (Exs.1 and 2, and Com. Exs.1 to 3).
Figure 9:
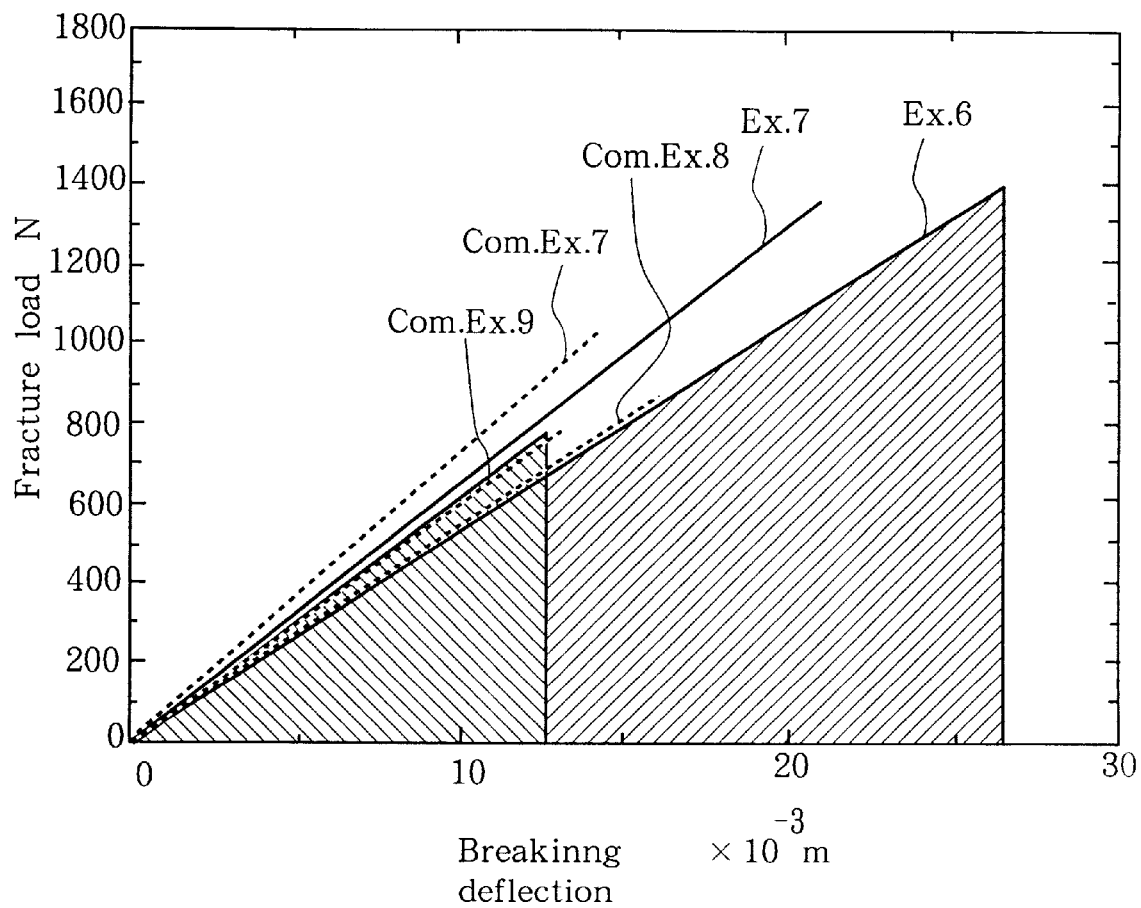
FIG. 9 is a schematic graph showing relation between fracture load and breaking deflection of shafts for use in iron club shafts (Exs.6 and 7, and Com. Exs.7 to 9).

Namely, the impact absorption energy was determined by calculating an area of a triangle, as seen from the FIGS. 8 and 9, which is formed by the three points, i.e. the origin, the point (fracture load, breaking deflection) and the breaking deflection point.

TABLE 1

| Reinforcing Fibers | Prepregs | Strand Tensile Properties | | | |
|---|---|---|---|---|---|
| | | Tensile strength (MPa) | Tensile modulus (GPa) | Breaking strain (%) | Density (g/cm$^3$) |
| GranocXN-05 | E0526A-10 | 1180 | 55 | 2.0 | 1.65 |
| GronocXN-10 | | 1750 | 106 | 1.7 | |
| GranocXN-15 | E1526C-10 | 2550 | 155 | 1.7 | 1.85 |
| Toray T300 | | 3530 | 230 | 1.5 | |
| Toray T700S | P3052S-12 | 4900 | 230 | 2.1 | 1.8 |
| Toray M30S | | 5490 | 294 | 1.9 | |
| Toray M40J | P9055F-11 | 4400 | 377 | 1.2 | |
| Toray M46J | | 4200 | 436 | 1.0 | |
| Toray M50J | | 4020 | 475 | 0.8 | |
| Toray M60J | | 3820 | 588 | 0.7 | |
| Fiberglass E-glass | unidirectional prepreg | 3100 | 72 | 4.3 | 2.54 |
| Aramid fiber Kevlar 49 | unidirectional prepreg | 3600 | 124 | 2.4 | 1.45 |

Unidirectional Composite Properties *1

| Tension properties | | | Compression properties | | |
|---|---|---|---|---|---|
| Tensile strength (MPa) | Tensile modulus (GPa) | Breaking strain (%) | Compression strength (MPa) | Compression modulus (GPa) | Breaking strain (%) |
| 690 | 33 | 1.8 | 870 | 32 | 2.9 |
| 1050 | 70 | 1.6 | 1070 | 64 | 2.1 |
| 1400 | 93 | 1.5 | 1180 | 85 | 1.8 |
| 1800 | 127 | 1.3 | 1420 | 138 | 1.0 |
| 2650 | 127 | 1.7 | 1400 | 129 | 1.4 |
| 3140 | 172 | 1.7 | 1520 | 175 | 0.9 |
| 2255 | 216 | 1.0 | 1225 | 220 | 0.7 |
| 2205 | 245 | 0.9 | 1030 | 240 | 0.5 |
| 2155 | 265 | 0.7 | 980 | 277 | 0.4 |
| 1865 | 343 | 0.6 | 880 | 345 | 0.25 |
| 1100 | 39 | 2.8 | 586 | 43 | 1.3 |
| 1380 | 76 | 1.8 | 270 | 74 | 0.36 |

*1 Tension properties and compression properties of unidirectional composite is $V_f$60 vol % conversion value

TABLE 2

| | | | | 4a Lamination range (mm) Number of laminations (Ply) *3 | 4b Lamination range (mm) Number of laminations (Ply) *3 | 4c Lamination range (mm) Number of laminations (Ply) *3 |
|---|---|---|---|---|---|---|
| | Prepregs | Reinforcing Fibers | Compressive breaking strain(%) *2 | | | |
| Ex.1 | E0526A-10 | XN-05 | 2.9 | Tip-500 3→0 | — | Tip-150 2.5→0 |
| Ex.2 | E1526C-10 | XN-15 | 1.8 | Tip-500 3→0 | — | Tip-150 2.5→0 |
| Comp. Ex.1 | P3052S-12 | T700S | 1.4 | Tip-500 3→0 | — | Tip-150 2.5→0 |
| Comp. Ex.2 | unidirectional fiberglass prepreg | Fiberglass | 1.3 | Tip-500 3→0 | — | Tip-150 3.5→0 |
| Comp. Ex.3 | unidirectional aramid fiber prepreg | Aramid fiber | 0.36 | Tip-500 3→0 | — | Tip-150 2→0 |
| Ex. 3 | E0526A-10 | XN-05 | 2.9 | Tip-500 5→0 | Tip-400 2→0 | Tip-150 2→0 |
| Ex.4 | E1526C-10 | XN-15 | 1.8 | Tip-500 5→0 | Tip-400 2→0 | Tip-150 2→0 |
| Comp. Ex.4 | P3052S-12 | T700S | 1.4 | Tip-500 5→0 | Tip-400 2→0 | Tip-150 2→0 |
| Comp. Ex.5 | unidirectional fiberglass prepreg | Fiberglass | 1.3 | Tip-500 5→0 | Tip-400 2→0 | Tip-150 3→0 |
| Comp. Ex.6 | unidirectional aramid fiber prepreg | Aramid fiber | 0.36 | Tip-500 5→0 | Tip-400 2→0 | Tip-150 1.5→0 |
| Ex.5 | E0526A-10 | XN-05 | 2.9 | Tip-500 3→0 | — | Tip-150 2→0 |
| Ex.6 | " | " | " | Tip-500 5→0 | Tip-400 2→0 | Tip-150 1.5→0 |
| Ex.7 | E1526C-10 | XN-15 | 1.8 | Tip-500 5→0 | Tip-400 2→0 | Tip-150 1.5→0 |
| Comp. Ex.7 | P3052S-12 | T700S | 1.4 | Tip-500 5→0 | Tip-400 2→0 | Tip-150 2→0 |
| Comp. Ex.8 | unidirectional fiberglass prepreg | Fiberglass | 1.3 | Tip-500 5→0 | Tip-400 2→0 | Tip-150 2→0 |
| Comp. Ex.9 | unidirectional aramid fiber prepreg | Aramid fiber | 0.36 | Tip-500 5→0 | Tip-400 2→0 | Tip-150 1→0 |

| | Straight layer (0°) | | | | Angle layer (±45°) | | | |
|---|---|---|---|---|---|---|---|---|
| | Prepregs | Reinforcing Fibers | Compressive breaking strain(%) *2 | Total length (mm) Number of laminations (ply) | Prepregs | Reinforcing Fibers | Compressive breaking strain(%) *2 | Total length (mm) Number of laminations (ply) |
| Ex.1 | P3052S-12 | T700S | 1.4 | 1244 3-ply | P9055F-11 | M40J | 0.7 | 1244 positive and negative, each 2-ply |
| Ex.2 | P3052S-12 | " | " | 1244 3-ply | P9055F-11 | " | " | 1244 positive and negative, each 2-ply |
| Comp. Ex.1 | P3052S-12 | " | " | 1244 3-ply | P9055F-11 | " | " | 1244 positive and negative, each 2-ply |
| Comp. Ex.2 | P3052S-12 | " | " | 1244 3-ply | P9055F-11 | " | " | 1244 positive and negative, each 2-ply |
| Comp. Ex.3 | P3052S-12 | " | " | 1244 3-ply | P9055F-11 | " | " | 1244 positive and negative, each 2-ply |
| Ex. 3 | P2053F-12 | T800H | unknown | 1244 4-ply | P9055F-11 | " | " | 1244 positive and negative, |

TABLE 2-continued

| | | | | | | | | |
|---|---|---|---|---|---|---|---|---|
| Ex.4 | P2053F-12 | " | " | 1244 4-ply | P9055F-11 | " | " | each 3-ply 1244 positive and negative, each 3-ply |
| Comp. Ex.4 | P2053F-12 | " | " | 1244 4-ply | P9055F-11 | " | " | 1244 positive and negative, each 3-ply |
| Comp. Ex.5 | P2053F-12 | " | " | 1244 4-ply | P9055F-11 | " | " | 1244 positive and negative, each 3-ply |
| Comp. Ex.6 | P2053F-12 | " | " | 1244 4-ply | P9055F-11 | " | " | 1244 positive and negative, each 3-ply |
| Ex.5 | P3052S-12 | T700S | 1.4 | 1065 4-ply | P9055F-13 | " | " | 1065 positive and negative, each 4→2ply |
| Ex.6 | P2053F-12 | T800H | unknown | 1065 5-ply | P9055F-13 | " | " | 1065 positive and negative, each 5→3ply |
| Ex.7 | P2053F-12 | " | " | 1065 5-ply | P9055F-11 | " | " | 1065 positive and negative, each 5→3ply |
| Comp Ex.7 | P2053F-12 | " | " | 1065 5-ply | P9055F-13 | " | " | 1065 positive and negative, each 5→3ply |
| Comp. Ex.8 | P2053F-12 | " | " | 1065 5-ply | P9055F-13 | " | " | 1065 positive and negative, each 5→3ply |
| Comp. Ex.9 | P2053F-12 | " | " | 1065 5-ply | P9055F-13 | " | " | 1065 positive and negative, each 5→3ply |

*1 Each numeral in parentheses is an orientation angle of fibers to the longitudinal direction of a shaft.
*2 $V_f$60% conversion value of a unidirectional composite plate.
*3 "Tip-□, Δ→0" in the column "Number of laminations" means that a prepreg was cut into a triangle and laminated so that the number of laminations was reduced from Δ-ply at the tip end to 0-ply at a point that is □ mm apart from the tip end.
*4 Both ends of a shaft were respectively cut by 50 mm after being cured.

TABLE 3

| | Mandrel used | | | | Prepreg lamination range (length from tip end) |
|---|---|---|---|---|---|
| | Tip diameter (mm) | Butt diameter (mm) | Length (mm) | Taper/1000 | (mm) |
| Example 1 | 3.75 | 14.55 | 1600 | 6.75 | 277–1521 |
| Example 2 | " | " | " | " | 284–1528 |
| Comp.Ex. 1 | " | " | " | " | 283–1527 |
| Comp.Ex. 2 | " | 14.39 | " | 6.65 | 301–1545 |
| Comp.Ex. 3 | " | 14.79 | " | 6.9 | 255–1499 |
| Example 3 | " | 15.43 | " | 7.3 | 81–1325 |
| Example 4 | " | " | " | " | 96–1340 |
| Comp.Ex. 4 | " | " | " | " | 95–1339 |
| Comp.Ex. 5 | " | " | " | 7.1 | 125–1369 |
| Comp.Ex. 6 | " | " | " | 7.5 | 49–1293 |
| Example 5 | 3.00 | 15.00 | 1500 | 8.0 | 298–1363 |
| Example 6 | " | 15.75 | " | 8.5 | 121–1186 |
| Example 7 | " | " | " | " | 133–1198 |
| Comp.Ex. 7 | " | " | " | " | 133–1198 |

TABLE 3-continued

| | Mandrel used | | | | Prepreg lamination range (length from tip end) |
|---|---|---|---|---|---|
| | Tip diameter (mm) | Butt diameter (mm) | Length (mm) | Taper/1000 | (mm) |
| Comp.Ex. 8 | " | " | " | " | 127–1192 |
| Comp.Ex. 9 | " | 16.20 | " | 8.8 | 90–1155 |

TABLE 4

| | Properties of shaft | | | | | | | Impact properties of tip portion (reinforced portion) of the shaft | | |
|---|---|---|---|---|---|---|---|---|---|---|
| | | Outer diameter | | Flexural rigidity | | Flexibility | | | | |
| | | | | Tip end - | Forward | Backward | | Fracture | Breaking | |
| | Weight (g) | Tip end (mm) | Butt end (mm) | Tip end (N · mm$^2$) | 300 mm point (N · mm$^2$) | flexibility (mm) | flexibility (mm) | Flexibility rate | load (N) | deflection (mm) | Impact absorption energy (J) |
| Example 1 | 47.2 | 8.49 | 15.06 | 1.15 × 10$^7$ | 1.71 × 10$^7$ | 220.6 | 248.9 | 1.128 | 659 | 27.0 | 8.9 |
| Example 2 | 47.4 | 8.52 | 15.11 | 1.79 × 10$^7$ | 1.90 × 10$^7$ | 215.2 | 226.5 | 1.053 | 610 | 21.0 | 6.4 |
| Comp. Ex 1 | 47.4 | 8.52 | 15.10 | 2.34 × 10$^7$ | 2.06 × 10$^7$ | 213.3 | 212.7 | 0.997 | 442 | 13.5 | 3.0 |
| Comp. Ex 2 | 47.6 | 8.49 | 15.07 | 1.22 × 10$^7$ | 1.76 × 10$^7$ | 216.2 | 242.7 | 1.122 | 379 | 15.1 | 2.9 |
| Comp. Ex.3 | 47.3 | 8.46 | 15.13 | 1.58 × 10$^7$ | 1.87 × 10$^7$ | 216.9 | 230.7 | 1.063 | 383 | 12.5 | 2.6 |
| Example 3 | 64.6 | 8.54 | 15.01 | 1.45 × 10$^7$ | 2.32 × 10$^7$ | 151.8 | 181.7 | 1.197 | 962 | 29.5 | 14.0 |
| Example 4 | 65.1 | 8.47 | 15.12 | 2.27 × 10$^7$ | 2.70 × 10$^7$ | 144.8 | 157.6 | 1.088 | 945 | 22.1 | 10.5 |
| Comp. Ex 4 | 65.1 | 8.47 | 15.11 | 3.01 × 10$^7$ | 3.00 × 10$^7$ | 143.4 | 145.8 | 1.017 | 728 | 14.5 | 5.3 |
| Comp. Ex 5 | 65.8 | 8.53 | 15.07 | 1.59 × 10$^7$ | 2.50 × 10$^7$ | 144.6 | 169.9 | 1.175 | 622 | 17.5 | 5.4 |
| Comp. Ex.6 | 64.4 | 8.53 | 15.02 | 2.08 × 10$^7$ | 2.51 × 10$^7$ | 151.9 | 168.9 | 1.111 | 544 | 13.7 | 3.7 |
| Example 5 | 62.4 | 9.45 | 15.28 | 2.04 × 10$^7$ | 3.25 × 10$^7$ | 96.4 | 102.8 | 1.066 | 1146 | 23.9 | 13.7 |
| Example 6 | 78.4 | 9.50 | 15.09 | 2.48 × 10$^7$ | 4.14 × 10$^7$ | 71.1 | 79.6 | 1.120 | 1574 | 25.7 | 20.2 |
| Example 7 | 79.1 | 9.53 | 15.20 | 3.78 × 10$^7$ | 4.70 × 10$^7$ | 67.9 | 70.2 | 1.034 | 1468 | 19.6 | 14.4 |
| Comp. Ex 7 | 79.1 | 9.54 | 15.19 | 4.83 × 10$^7$ | 5.07 × 10$^7$ | 67.1 | 65.4 | 0.974 | 1030 | 12.1 | 6.2 |
| Comp. Ex 8 | 80.5 | 9.57 | 15.15 | 2.67 × 10$^7$ | 4.24 × 10$^7$ | 70.0 | 77.8 | 1.111 | 857 | 13.6 | 5.8 |
| Comp. Ex.9 | 78.2 | 9.46 | 15.16 | 3.30 × 10$^7$ | 4.40 × 10$^7$ | 70.6 | 74.6 | 1.056 | 848 | 12.0 | 5.1 |

*Tip section (350 mm long) separated from the shaft was measured for impact properties As shown in Table 4, the shafts of Examples 1–7 were limited in the flexural rigidity of the tip portion to a lower level than that of the shafts of Comparative Examples 1–9, showing that the shafts of Examples 1–7 have a flexible characteristics and high impact absorption energy.

Incidentally, as shown in Table 1, tensile properties and compressive properties of various strands and of unidirectional composites were also measured.

The reinforcing fibers such as carbon fibers are frequently combined with a matrix resin such as an epoxy resin. Each method for evaluating the mechanical properties of a fiber reinforced composite material is prescribed in ASTM or JIS. In this invention, the tensile properties and compressive properties of carbon fiber unidirectional composite materials were measured according to the tensile test method prescribed in ASTM D3039-76 and the compressive test method prescribed in ASTM D3410-87, respectively.

What is claimed is:

1. A tapered hollow shaft made of a fiber reinforced composite material, which comprises:
    (a) at least one angle layer consisting essentially of polyacrylonitrile-based carbon fibers having a tensile modulus ranging from 200 to 500 GPa and a tensile strength ranging from 4000 to 5600 MPa;
    (b) at least one straight layer consisting essentially of polyacrylonitrile-based carbon fibers having a tensile modulus ranging from 200 to 460 GPa and a tensile strength ranging from 3500 to 5600 MPa;
    (c) at least one reinforcing layer consisting essentially of pitch-based carbon fibers or polyacrylonitrile-based carbon fibers each having a compressive breaking strain of 1.7 to 5.0 %, a tensile modulus ranging from 5 to 160 GPa, a tensile strength ranging from 500 to 3000 MPa and a density ranging from 1.5 to 1.9 g/cm$^3$ with the carbon fibers in the reinforcing layer being oriented to incline at an angle of 0° to ±50° to the axial direction of the shaft, with said reinforcing layer being arranged at a thinner portion of the shaft to extend from a tip end thereof up to at least 1/20 and not more than 3/4 of the entire length of the shaft, and with the reinforcing layer being arranged at an outermost portion of the shaft.

2. The tapered hollow shaft according to claim 1, wherein said reinforcing layer is arranged at the thinner portion of the shaft to extend from a tip end thereof up to at least 1/10 and not more than 2/3 of the entire length of the shaft.

3. The tapered hollow shaft according to claim 1, wherein the reinforcing layer covers a portion of the shaft extending from a tip end thereof up to a point that is 250 mm apart from the tip end at least, and wherein the reinforcing layer covers a portion of the shaft extending from a tip end thereof up to a point that is 500 mm apart from the tip end at most.

4. The tapered hollow shaft according to claim 3, wherein said shaft has impact absorption energy of 5.5 J to 20 J, measured by an impact test for a reinforced portion of the thinner portion of the shaft, the flexural rigidity ranging from 0.8×10$^7$ N·mm$^2$ to less than 3.0×10$^7$ N·mm$^2$ of the reinforced portion covering a per portion of the shaft extending from the tip end of the shaft up to a point that is 300 mm apart from the tip end, and the flexibility rate of backward flexibility/forward flexibility of 1.05 to 1.50.

5. The tapered hollow shaft according to claim 4, wherein said shaft has weight in the range of 40 g to 65 g, the length in the range of 1016 mm to 1220 mm, an outer diameter at the tip end of the shaft in the range of 8.2 mm to 9.5 mm and an outer diameter of a butt end of the shaft in the range of 14.5 mm to 18 mm.

6. The tapered hollow shaft according to claim 3, wherein said shaft has impact absorption energy of 6.5 J to 25 J, measured by an impact test for an reinforced portion of the thinner portion of the shaft, the flexural rigidity ranging from $1.5 \times 10^7$ N·mm$^2$ to less than $5.0 \times 10^7$ N·mm$^2$ of the reinforced portion covering a portion of the shaft extending from the tip end of the shaft up to a point that is 300 mm apart from the tip end of the shaft, and the flexibility rate of backward flexibility/forward flexibility of 1.00 to 1.50.

7. The tapered hollow shaft according to claim 6, wherein said shaft has weight in the range of 60 g to 85 g, the length in the range of 860 mm to less than 1016 mm, an outer diameter at the tip end of the shaft in the range of 9.2 mm to 10.5 mm and an outer diameter of a butt end of the shaft in the range of 14.5 mm to less than 18 mm.

* * * * *